US006236489B1

(12) United States Patent
Vinokur et al.

(10) Patent No.: US 6,236,489 B1
(45) Date of Patent: May 22, 2001

(54) LIGHT-MODULATING CELL AND AN OPTICAL DEVICE UTILIZING SAME

(75) Inventors: Klara Vinokur, Ashdod; Nahum Gorbatov, Rehovot; Erik Hendell, Tel-Aviv, all of (IL)

(73) Assignee: Fabia Engineering (1992) Ltd. (IL)

( * ) Notice: Subject to any disclaimer, the term of this patent is extended or adjusted under 35 U.S.C. 154(b) by 0 days.

(21) Appl. No.: 09/307,427

(22) Filed: May 10, 1999

(51) Int. Cl.[7] .................................................. G02F 1/03
(52) U.S. Cl. ............................................. 359/245; 359/237
(58) Field of Search ............................... 359/237, 242, 359/245, 246, 247, 248, 250, 252, 253, 257, 258, 259

(56) References Cited

U.S. PATENT DOCUMENTS 5,363,228 * 11/1994 DeJuhe et al. ........................ 359/245

OTHER PUBLICATIONS

Linda Geppert, Editor, IEEE Spectrum, "A Variable Light-Blocker", Dec. 1997, p. 65.
A.A. Karetnikov, Opt. Spectrosk (USSR) 67, "Using the Interface Between Glass and a Nematic Liquid Crystal for Optical–Radiation Polarization Over a Broad Spectral Range", Aug. 1989, 324–326.
T. Nose et al. of the SID, "LCD Devices Obtained Using Scattering Properties of Microlens Effects", 1991, vol. 32/3.
N. Wakita et al., "Shock–Problem Free FLCD and Mechanism of Alignment Destruction by Mechanical Shock", at the FLC 93 Program conference in Tokyo, 1990, pp. 367–368.
C. Escher & R. Wingen, Adv. Matter, "Ferroelectric Liquid Crystals in High Information Content Display", 4, p. 189, No. 3 (1992).
N. Yamamoto et al., Jpn. J. Appl. Phys., "Ferroelectric Liquid Crystal Display with High Contrast Ration", Mar./1989, vol. 28 No. 3, pp. 524–529.
M.R. Meadows et al., Appl. Phys. Lett, "Electro–Optic Switching Using TIR by a Ferroelectric Liquid Crystal", 1989, 54(15).
B.O. Myrvold, Mol. Cryst. Liq. Cryst., "The Relationship Between the Physical Properties of the Alignment Layer and the Quality of SSFLC Cells", 1991, vol. 22.
D. Armitage, J. Appl. Phys., "Thermal Properties and Head Flow in the Laser Addressed Liquid–Crystal Display", Mar. 1981, 52(3).
Jpn. J. Appl. Phys., "Pigtailed compact tunable wavelength–selective filter using an LC for wavelength–division–multiplexing", 1992, vol. 31, pp. 1335–1337.

* cited by examiner

*Primary Examiner*—Hung Xuan Dang
(74) *Attorney, Agent, or Firm*—Venable; Robert Kinberg (57) ABSTRACT

A light-modulating cell for providing a desired propagation of light impinging thereon is presented. The cell comprises at least two substrates, made a material substantially optically transparent with respect to incident radiation of a desired wavelength range, and at least one reservoir attached to at least one of the substrates. These at least two substrates define a plurality of spaced-apart outer surfaces and a sealed therebetween, respectively. The space is filled with a first, substantially liquid light-modulating medium, while the reservoir contains predetermined amount of a second, substantially liquid light-modulating medium. The inside of the reservoir is connected to the inside of the sealed space for providing a continuous flow of the first and second media into and out of the space.

22 Claims, 6 Drawing Sheets

LIGHT-MODULATING CELL AND AN OPTICAL DEVICE UTILIZING SAME

FIELD OF THE INVENTION

The present invention relates to a light-modulating cell particularly useful in optical device for providing the desired propagation of light impinging thereon.

BACKGROUND OF THE INVENTION

Optical devices based on a light-modulating cell are well known and widely used as beam splitters, polarizing beam splitters, light valves, flat panel displays, switches, shutters, retarders, lenses, filters, etc. The conventional light-modulating cell is typically formed by a pair of glass substrates and an optical medium therebetween. At present, most of the existing embodiments of a light modulating cell employ a liquid crystal (LC) material as optical medium. Other kinds of substantially liquid optical mediums are also used with light modulating cells, for example, oriented organic materials, emulsion solutions, gels, etc. The use of emulsion solution is disclosed, for example, in the article "*A Variable Light-Blocker*", Linda Geppert, Editor, IEEE Spectrum, December 1997, p. 65.

Figure 1:
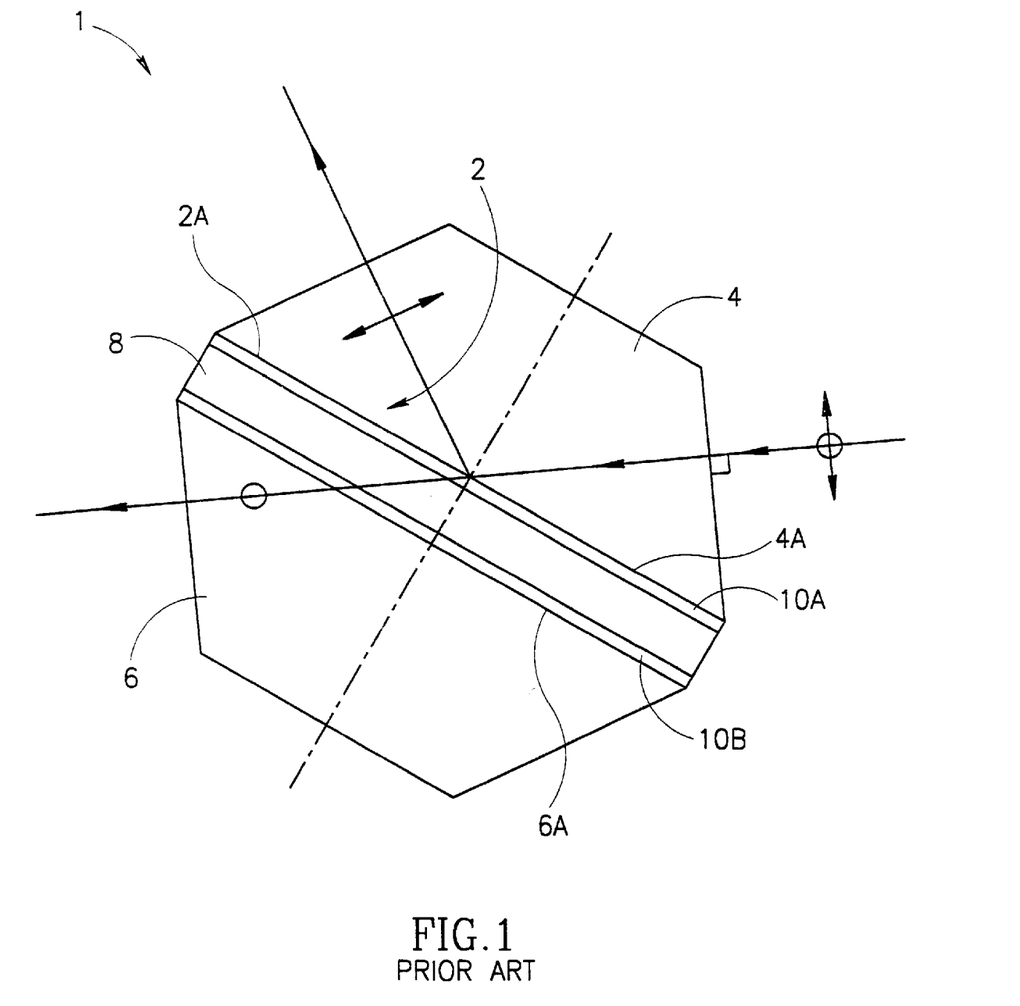
FIG. 1 is a schematic illustration of the main components of a conventional PBS device.

The LC cell represents a birefringent medium effecting a double refraction of light impinging thereon. This property of the LC cell enables it to be employed in various optical devices, for example, in polarizer beam splitters (PBSs). The construction and operation of PBS device are known per se, being disclosed, for example, in the article "*Using the Interface Between Glass and a Nematic Liquid Crystal for Optical-Radiation Polarization Over a Broad Spectral Range*", A. A. Karetnikov, Opt. Spectrosk, (USSR), 67, 324–326 , August 1989. As illustrated in FIG. 1, a conventional PBS device, generally designated 1, comprises LC cell 2 located between parallel sides 4a and 6a of a pair of glass prisms 4 and 6. The LC cell 2 typically comprises a layer 8 formed of a nematic liquid crystal (NLC) material, which is enclosed between two so-called "orienting layers" 10a and 10b formed on the outer surfaces of the sides 4a and 6a. Beam propagation through the PBS device 1 and the polarization separation produced thereby are shown in FIG. 1 in a self-explanatory manner and therefore need not be specifically described.

A common drawback of such LC cell based PBS devices is the unavoidable requirement of substantially stable and constant thermal surroundings. A PBS device typically provides high polarization purity, unless subjected to thermal variations.

Figure 2A:
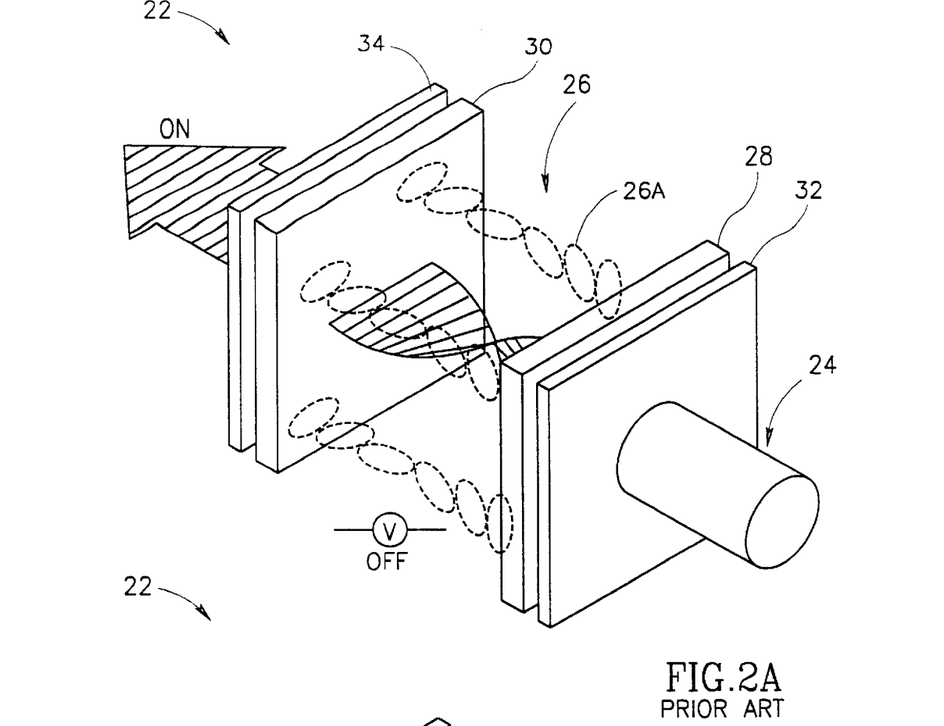
FIGS. 2a and 2b schematically illustrate the main principles of a conventional Twisted Nematic (TN) cell based technology.
Figure 2B:
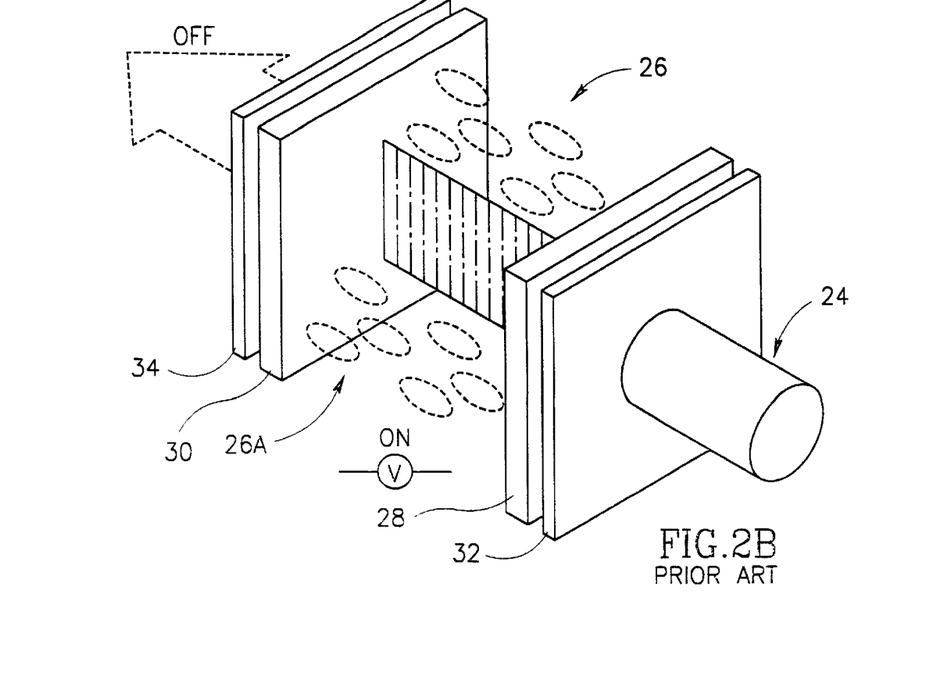

A similar problem exists in other LC cell based applications. For example, flat-panel liquid crystal displays (LCDs), which, due to their low drive voltage, low power consumption and readability in bright ambient light, have become very popular and are widely used in watches, calculators, games, information boards, portable computers, pocket television, etc. A common arrangement of LCD is illustrated in FIGS. 2a and 2b, showing the main principles of LCD technology based on so called twisted NLC cell. LCD, generally designated 22, comprises a light source 24, and LC cell, generally at 26. The light source 24 provides a back illumination of the LC cell 26. The cell 26 includes LC layer 26a, disposed within a space between two parallel glass plates 28 and 30. The glass plates 28 and 30, functioning as transparent electrodes, are formed with polarizing films 32 (polarizing) and 34 (analyzing), respectively, on their outer surfaces. The operation of LCD is known per se, being shown in the drawings in a self-explanatory manner, and is therefore, not specifically described. One of the essential limitations of LCDs of the kind specified above consists of the susceptibility of the cell 26 to thermal variations.

LCDs based on scattering properties of microlens effects have been developed and disclosed, for example, in T. Nose et. al. Proc. Of the SID, Vol. 32/3, 1991. The main problem of such devices is their susceptibility to pressure variation due to molecular reorientation.

Replacing one of the LC cell glass substrates with a plastic substrate as suggested by N. Wakita at. el. at the FLC 93 PROGRAM conference in Tokyo, pp. 367–368, significantly improves weight and cost parameters of the LCD and increases its flexibility and mechanical shock resistivity. However, susceptibility to thermal variation almost does not change.

Bistable Ferroelectric LC (FLC) based devices are well known, being disclosed, for example, in "*Ferroelectric Liquid Crystals in High Information Content Displays*", C. Escher and R. Wingen, Adv. Matter 4 (1992) No. 3. Such devices are based on a special structure of FLC that enables fast switching. The method of oriented FLC cell preparation based on smectic A smectic C phase transition in responsive to density variations of the FLC material. The FLC material volume changes during cell preparation, thus causing pressure changes within the FLC cell, which, in turn, result in the creation of zig-zag like defects which subsequently damage the cell. This is more specifically disclosed, for example, in "Ferroelectric Liquid Crystal Display with High Contrast Ratio", N. Yamamoto et. al. Jpn. J. Appl. Phys. Vol. 28 No. 3 March 1989, 524, "*Electro-Optic Switching Using TIR by a Ferroelectric Liquid Crystal*", M. R. Meadows at. al., Appl. Phys. Lett. 54 (15), 1989, "*The Relationship Between the Physical Properties of the Alignment Layer and the Quality of SSFLC Cells*", B. O. Myrvold, Mol. Cryst. Liq. Cryst. vol. 22, 1991).

At present, FLC mixtures are characterized by a temperature operating range at $-10°$ C.$—55°$ C. It is anticipated that in the future, FLC mixtures with ferroelectric phase between $-30°$ C. and $70°$ C. and a fast response time will be realized. It is known that FLC material is characterized by such properties as tilt angle and temperature dependence. It was found that a tilt angle close to $22.5°$ C. with weak temperature dependence is the optimal condition for achieving the best contrast of FLCDs. Such trends emphasize FLC device susceptibility to thermal variations.

Laser addressed LCDs have been developed and disclosed, for example, in "*Thermal Properties and Heat Flow in the Laser Addressed Liquid-Crystal Display*", D. Armitage, J. Appl. Phys. 52 (3), March 1981. The operation of a laser addressed LCD is based on the local heating of its LC cell to manipulate pixels. Obviously, such thermal changes constrain the deterioration of the LC cell condition and damage the LC cell's performance.

A tunable wavelength-selective filter is an extremely important device for wavelength-division-multiplexing systems. Wide versions of electrically tunable filters have been actively studies. For example, the LC Fabry-Perot interferometer stands out for its compact size, low driving voltage, narrow band-pass, low loss, and wide tuning range filter as proposed in "*Pigtailed compact tunable wavelength-selective filter using a LC for wavelength-division-multiplexing*" Jpn. J. Appl. Phys. Vol. 31 (1992) pp. 1355–1357. This type of LC cell based device is also susceptible to thermal variations.

Generally, it is often the case that a light-modulating cell base device is part of the optical system and, therefore, should meet the requirements associated with operating under various thermal conditions. However, the light-modulating cell exposed to thermal variations experiences, inter alia, pressure changes within the cell. Such pressure changes involve density variations of the LC material and expansion or compression of the cell's walls. As a result, the LC based device and the entire optical system employing the same will exhibit performance deterioration.

SUMMARY OF THE INVENTION

There is accordingly a need in the art to substantially improve the performance of light-modulating techniques, by providing a novel light-modulating cell.

It is a major object of the present invention to provide such a cell that provides compensation for pressure changes that may occur there inside.

There is thus provided, according to one aspect of the present invention, a light-modulating cell comprising:

- at least two substrates made of a substantially optically transparent material with respect to incident radiation of a desired wavelength range, the substrates defining, respectively, a pair of space-apart surfaces and a sealed space therebetween, the space being filled with a first substantially liquid light modulating medium; and
- at least one reservoir attached to at least one of said substrates, the reservoir containing a predetermined amount of a second substantially liquid light modulating medium, the inside of the reservoir being connected to the inside of said space for providing a continuous flow of the first and second media into and out of said space.

The idea of the present invention consists of significantly minimizing the susceptibility of a light-modulating cell to pressure changes within the space between the optically transparent substrates. Pressure changes may be caused by thermal changes, mechanical deformations, etc. The provision of such a reservoir is simple to construct, efficient and is also a cost effective solution for eliminating or at least substantially reducing the requirement for stringent thermal conditions in the vicinity of the cell. The first and second light modulating media may be or may not be identical. The reservoir can be easily mounted in such a manner that it does not affect the light propagation through the cell, in order to meet the requirements of a specific application. Alternatively, if desired, the reservoir can be installed so as to affect the light propagation.

The reservoir is in the form of a hollow housing, which is preferably made of an optically transparent material. The housing may be a separate unit glued to at least one of the substrates. The inside of the reservoir and the space are connected to each other by means of at least one pair of openings or slots provided, respectively, in the reservoir and in the substrate.

Preferably, at least one pair of abutting rims of, respectively, the pair of the outer surfaces defining said space are formed with beveled edges so as to form at least one elongated pit. Such pit may be filled with gluing and sealing materials, providing thereby safety sealing of the cell.

The reservoir's housing may be constituted by at least a portion of the pit designed as described above, namely formed by the beveled edges of a pair of abutting rims, the portion of the pit being sealed by a cover. The sealed cover may be in the form of a glass slide or adhesive tape glued to the pit margins. Obviously, any other suitable sealed cover may be provided. The pit is filled with the second light modulating medium and then sealed. To this end, a certain amount of residual air or any other suitable gas is preferably provided within the reservoir so as to meet the requirements of a specific application. Sealing the remaining clearances at opposite sides of the cover with a suitable gluing material provides, on the one hand, safe sealing of the reservoir and, on the other hand, of the entire cell.

According to another aspect of the present invention there is provided an optical device utilizing at least one light-modulating cell for providing a desired propagation of light impinging thereon, said at least one cell comprising:

- a pair of spaced-apart substrates made of a substantially optically transparent material with respect to incident radiation of a desired wavelength range, the substrates defining, respectively, a pair of spaced-apart parallel outer surfaces thereof and a sealed space therebetween, the space being filled with a first substantially liquid light modulating medium; and
- at least one reservoir attached to at least one of said substrates, the reservoir containing a predetermined amount of a second substantially liquid light modulating medium, the inside of the reservoir being connected to the inside of said space for providing a continuous flow of the first and second media into and out of said space.

More specifically, the present invention is used in PBS devices and is therefore described below with respect to this application.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

FIG. 1 illustrates one example of a conventional LC based PBS device, generally designated 1. Here the conventionally designed LC cell 2 is used as a birefringent medium for splitting an unpolarized radiation into two spatially separated light components having the different polarizations. FIGS. 2a and 2b illustrate another example of a conventional LC based device in the form of a TN LC cell 22, whose LC cell 26 functions as a light valve.

Figure 3A:
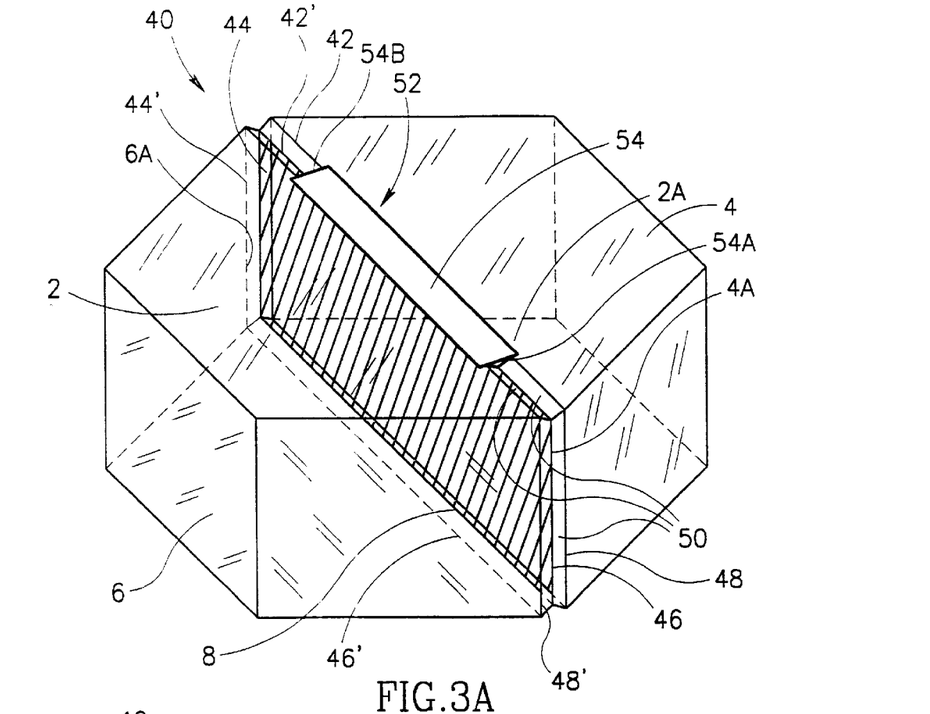
FIG. 3a illustrates a PBS device constructed according to one embodiment of the invention.

Referring to FIG. 3a there is shown a PBS device, generally designated 40, constructed according to one embodiment of the present invention. Same reference numbers are used for identifying those components, which are identical in the devices 1 and 40, in order to facilitate understanding. The device 40 comprises two optically transparent prisms 4 and 6 and a birefringent medium in the form of LC cell 2 located between the outer surfaces of the parallel sides 4a and 6a of the prisms 4 and 6, respectively. The cell 2 is constructed similar to that of the device 1, namely including the layer 8 of NLC enclosed between two orienting layers, which are not specifically shown. The LC layer 8 fully occupies the space between the prisms 4 and 6.

The prisms 4 and 6 are cemented to each other fully along their mutual circumference. To this end, as shown in FIG. 3a, and more specifically in FIG. 3b, rims 42, 44, 46 and 48 of the prism 4 and corresponding, abutting thereto, rims 42'–48' of the prisms 6 are formed with beveled edges so as to define four elongated pits, generally at 50. The pits 50 are filled with a suitable gluing material, which is not specifically shown.

Figure 3B:
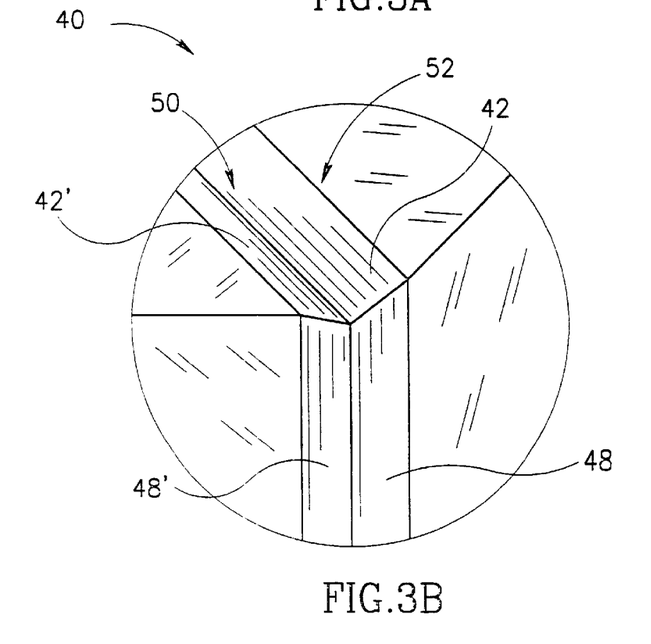
FIGS. 3b and 3c more specifically illustrate a reservoir of FIG. 3a in its opened empty and sealed manufacturing stages, respectively.

One of the essential features of the present invention consists of the provision of at least one reservoir, generally at 52, that is attached to the PBS device 40 and filled with the LC material (not shown) similar to that of the cell 2. The reservoir 52 is formed by a portion of one of the pits 50 and by a special adhesive tape 54, which cups the respective portion of pit 50. The pit 50 thus represents the empty reservoir 52 (FIG. 3b). As better shown in FIG. 3b, the reservoir 52 is sealed by the tape 54 and by gluing material, generally at 55, located in the pit 50 at opposite ends 54a and 54b of the tape 54.

Figure 3C:
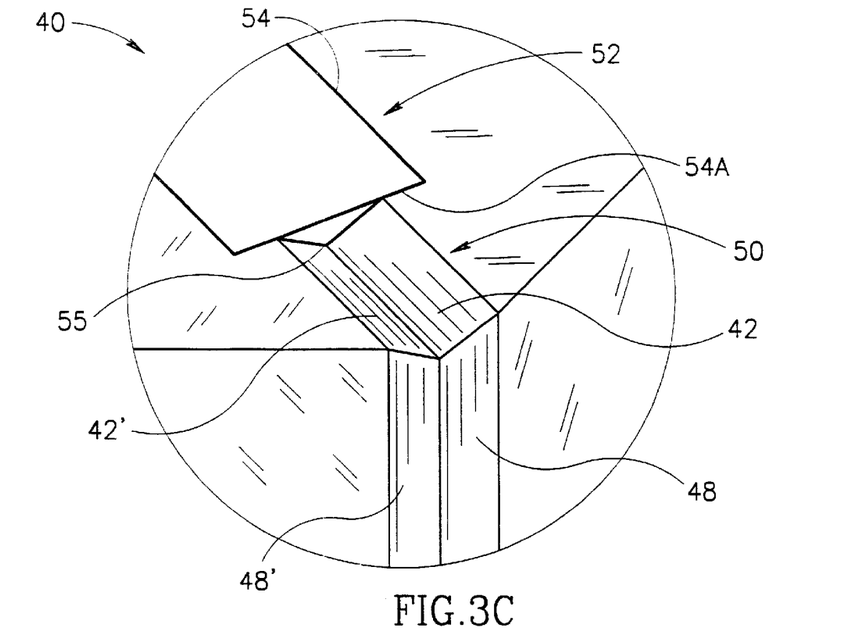

Hence, in the present example of FIGS. 3a–3c, the reservoir 52 is designed like a hollow tube having a substantially triangular cross-section. Obviously, any other geometry of the pit and accordingly of the reservoir's housing may be provided. It is understood, although not specifically shown, that either opening(s) in either edge 42 or 42' of the pit 50 or a clearance between the edges is appropriately provided so as to provide a continuous liquid vessel between the cavities defined by the reservoir 52 and the cell 2. This enables the circulation of the LC material, contained within the cell and reservoir, into and out of the cell 2 to be provided.

Any kind of temperature stable gluing materials can be used, for example, known UV glue, alkyl or the like. The filling of the reservoir 52 with the LC material is carried out by any suitable means, for example, a syringe, so as to provide the desired amount of LC material in the reservoir.

Thus, the LC material contained in the cell 2 and in the reservoir 52 creates a continuous LC bath. Such LC reservoir 52 functions like a buffer vessel avoiding a pressure rise/drop of the LC material inside the cell 2. The LC material, fully occupying the space between the two prisms, is confined by this space due to capillary forces. However, when subjected to pressure changes, the LC material within the cell 2 is free to flow inside and/or outside the reservoir 52. The amount of residual air, or any other suitable gas, left in the reservoir after sealing it with the gluing material is selected so as to meet the requirements of a specific application. Additionally, the grounding of the pit's edges increases the surface area thereof and provides better adhesion for sealing materials.

The operation of the device 40 is known per se, being also schematically illustrated in FIG. 1, and, therefore, need not be more specifically described. It is understood that, according to the present example, the reservoir 52 is located so as to be out of the optical paths of input and output light components and, therefore, not to impede the beams propagation. It should be noted, although not specifically shown, that the reservoir may be placed so as be the part of a light modulating procedure, i.e. to affect the light propagation.

It should also be specifically noted that, generally, the single pair of so provided abutting rims could be designed like a pit and formed with a sealed portion thereof containing the LC material. Thus, such a pit serves, on the one hand, as the reservoir 52 for the cell 2 and, on the other hand, as a safety sealing means for the whole device 40.

Figure 4:
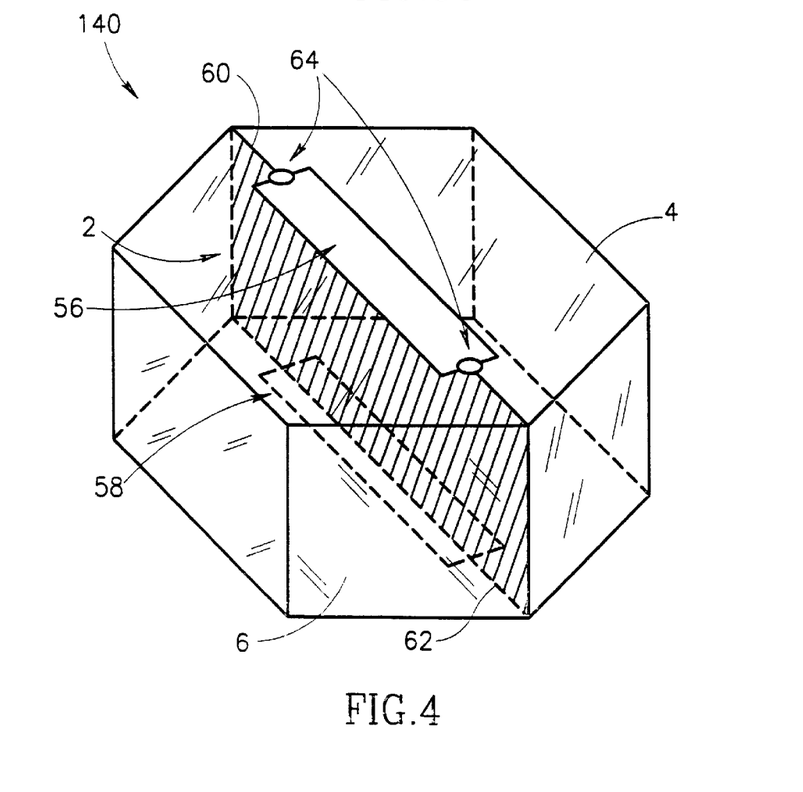
FIG. 4 illustrates a PBS device constructed according to another embodiment of the invention.

Alternatively, more than one such reservoir could be provided for the same LC cell. FIG. 4 illustrates a PBS device, generally designated 140, having a somewhat different construction in comparison to that of the device 40. Similarly, the same reference numbers identify the common components of the devices 40 and 140. The LC cell 2 of the device 140 is associated with two reservoirs 56 and 58. According to the present example, the reservoirs 56 and 58 are in the form of hollow pipe-like housings, which are attached to opposite ribs 60 and 62, respectively, of the cell 2. The housings 56 and 58 are filled with the required amount of LC material. Each of the housing is by its one side attached to a corresponding one of the ribs 60 and 62 by means of a gluing material, generally at 64. Openings (not shown) are provided in the housings so as to face respective openings (not shown) in the ribs 60 and 62, providing thereby the connection between the inside of the cell and of the reservoirs.

It should be noted, although not specifically shown, that LC material in the cell 2 and, accordingly, in the reservoir(s) may be replaced by any other suitable substantially liquid light modulating medium, for example, oriented organic material, emulsion solutions, or gels.

The above concept of designing a PBS is more specifically disclosed in a co-pending U.S. patent application Ser. No. 09/014355 assigned to the assignee of the present application. This application is, therefore, incorporated herein by reference with respect to this specific example, where such a light-modulating cell is the part of a PBS device.

Figure 5A:
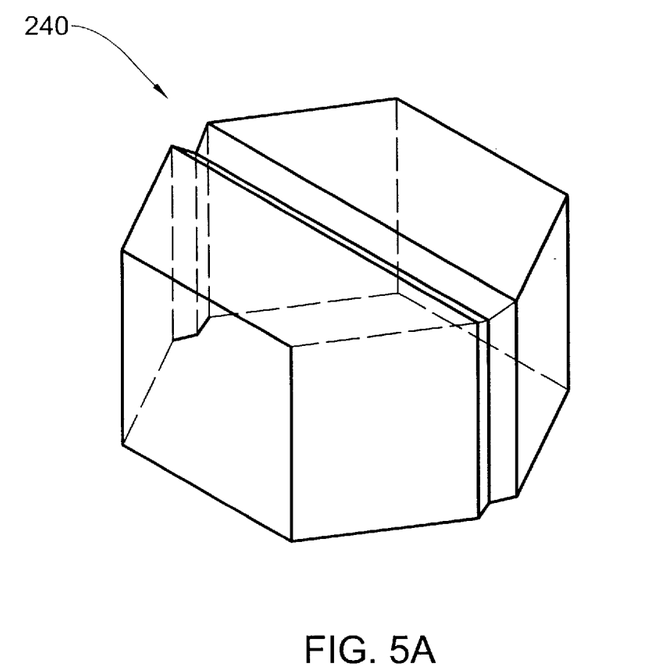
FIGS. 5a and 5b schematically illustrates the experimental results of the operation of the device of either of FIGS. 3a and 4 in comparison to the conventional device of FIG. 1; land
Figure 5B:
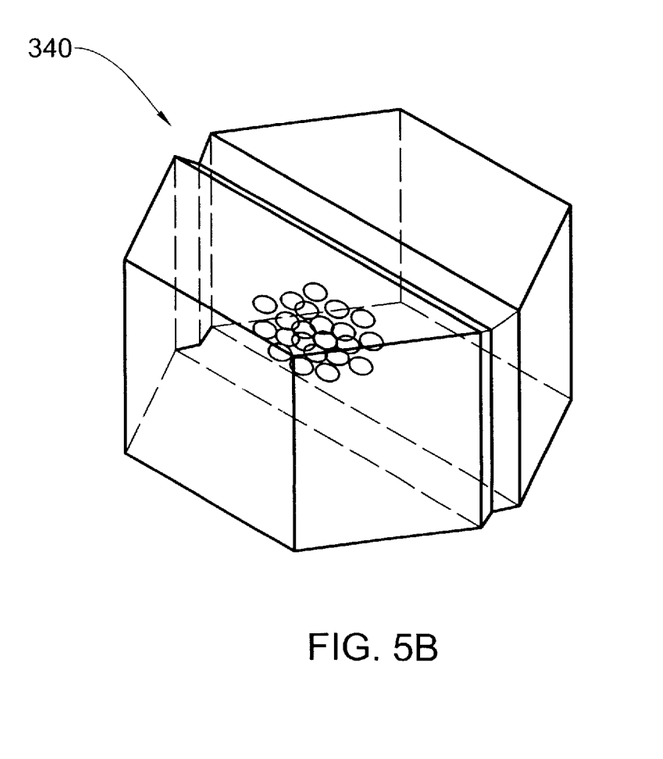

Reference is now made to FIGS. 5a and 5b illustrating the experimental results corresponding, respectively, to thermal changes applied to two PBS devices of the kind specified, generally designated 240 and 340. The devices have generally similar constructions, similar to that of the previously described embodiments, but are, respectively, with and without the reservoir, which is not specifically shown. Both PBS devices were heated from the initial temperatures 21° at heating rate about 10° per minute. When the temperature reaches 65°, the heating was stopped and PBS devices were left for cooling spontaneously. As shown in FIG. 5b, in the PBS 340, who has no reservoir, a destructive irreversible air bubbles fractal pattern type was developed almost immediately. In the PBS 240 equipped with the reservoir no changes were detected, as clearly seen in FIG. 5a. Further testing of the PBS 240 and 340 devices under same cooling rate demonstrated the similar results. Moreover, the optical performance of the "reservoired" PBS device 240 did not change after such heating/cooling experiments.

Figure 6:
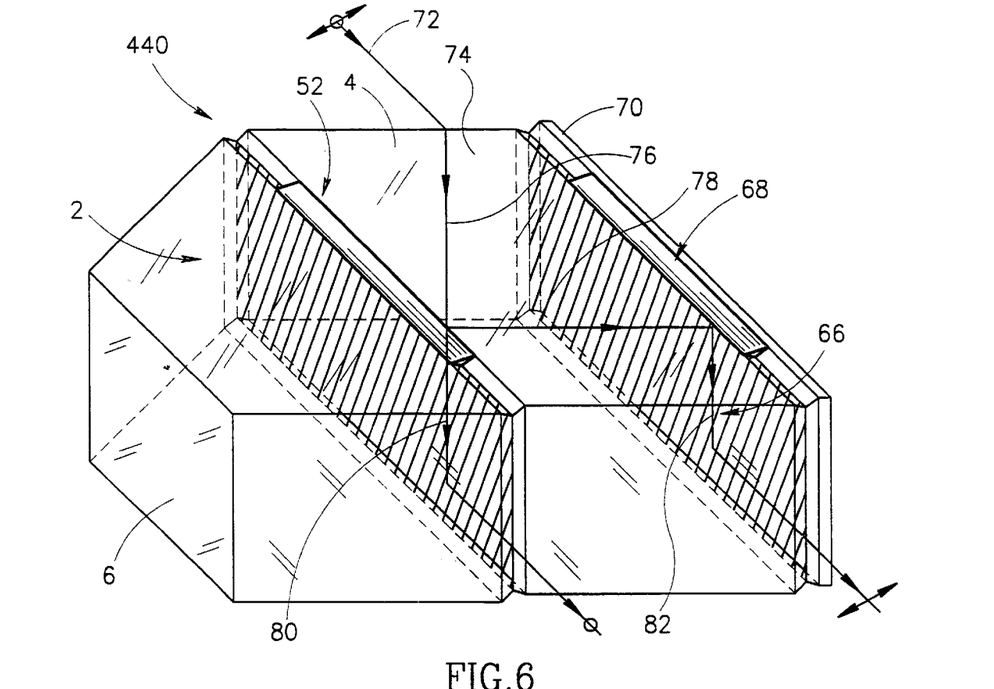
FIGS. 6 and 7 illustrate two more embodiments of the invention.

FIG. 6 illustrates yet another embodiment of a PBS device, generally designated 440, designed according to the invention. The device 440, in distinction to the previously described examples, comprises an additional light-modulating (birefringent) cell, generally at 66, equipped with its reservoir 68. The cell 66 is located on an outer surface of the input prism 4 (i.e. the prism on which an incident unpolarized radiation to be split falls) and is substantially parallel to the cell 2 accommodated between the prisms 4 and 6. The cell 66 is constructed similar to the cell 2, being formed of the similar substantially liquid light modulating material, for example LC. An absorbing plate 70 covers the outer surface of the cell 66. According to the present example, the reservoir 68 is attached to the cell 66 in a manner similar to that of the reservoir 52. It is appreciated that any other attachment may be applied so as to provide a continuous flow of the LC or the like material between the inside of the cell and its corresponding reservoir (s).

The provision of the additional cell 66 is aimed at the following. As shown schematically in order to facilitate the illustration, an unpolarized beam 72 of incident radiation impinges onto the prism 4 at its side 74 and propagates therethrough producing a refracted beam 76 which, in turn, falls onto the cell 2 resulting in totally reflected and propagating beams 78 and 80, for example of p- and s-polarizations, respectively. The additional cell 66 defines an additional interface on which the totally reflected beam 78 undergoes a further total internal reflection producing a beam 82. This improves the efficiency of the PBS device. Indeed, if the totally reflected, substantially p-polarized beam 78 occasionally contains s-polarized light component, this component will be split by the cell 66, owing to the fact that the latter functions in respect of the s-polarization similar to the cell 2. This s-polarized component, when separated, is absorbed by the plate 68.

Figure 7:
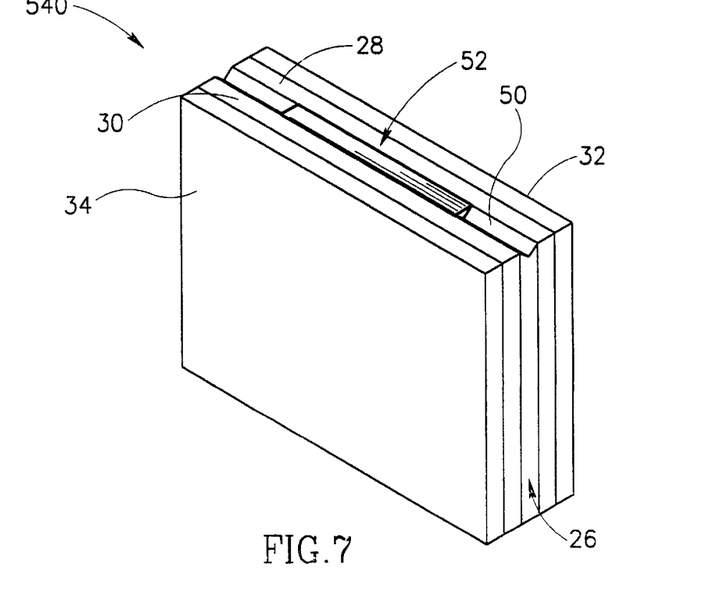

Referring now to FIG. 7, there is illustrated yet another example of the present invention applied to a FLCD device, generally designated 540. Similarly, those components, which are identical in the TNLC devices 22 (FIGS. 2a and 2b) and 540, as well the common components in the previously described embodiments, are identified by the same reference numbers, in order to facilitate understanding. The spatial light modulator 540 comprises LC cell 26 formed by FLC material disposed within the space between the outer surfaces of two parallel glass plates 28 and 30. The glass plates 28 and 30 are formed with the polarizing films 32 and 34, respectively, on their opposite sides. As shown, a reservoir 52 is attached to the LC cell 26, the reservoir being formed by the central portion of a pit 50. Again, any number of pits (up to four) could be provided for gluing and sealing purposes. The LC cell can be provided with any number of reservoirs, which may be and may not be associated with the pit(s).

The advantages of the present invention are thus self-evident. A light-modulating cell equipped with a reservoir that contains either the same or not light modulating medium and is coupled to the cell so as to provide a continuous flow of the media, exhibits an improved behavior of the cell under pressure changes caused by various factors. This solution is simple, cost effective and does not damage or affect other aspects of the light-modulating cell and the optical device utilizing same.

Those skilled in the art will readily appreciate that various modifications and changes can be applied to the present invention as hereinbefore exemplified without departing from its scope defined in and by the appended claims. The concept of the present invention may be applied to any other suitable device based on modulating the propagation of light, for example modulating the orientation of a polarization direction of light passing therethrough. Each light-modulating cell employed in the optical device can be provided with a desired number of reservoirs. A reservoir could be of any shape and could be installed by any suitable means, as long as it allows for the continuous flow of the light modulating media between the inside of the cell and reservoir and does not interfere with the optical pathways. The reservoir's housing, as well as its cover, which may be in the form of adhesive tape, glass slide, or the like, may be formed of any suitable isolation material, providing it is inert to the selected light modulating material and sealing glue. The cell's substrates could be of any suitable material adequate to any wavelength range. The reservoir's components function as the part of the optical modulating process.

What is claimed is:

1. A light-modulating cell for providing a desired propagation of light impinging thereon, the cell comprising:

at least two substrates made of a substantially optically transparent material with respect to incident radiation of a desired wavelength range, the substrates defining, respectively, a plurality of spaced-apart outer surfaces and a sealed space therebetween, the being filled with a first substantially liquid light modulating medium; and at least one reservoir attached to at least one of said substrates, the reservoir containing a predetermined amount of a second substantially liquid light modulating medium, the inside of the reservoir being connected to the inside of said space for providing a continuous flow of the first and second media into and out of said space.

2. The cell according to claim 1, wherein said first and second media are either identical or not.

3. The cell according to claim 1, wherein said at least one reservoir comprises a hollow housing having an opening that faces a corresponding opening made in either of the substrates.

4. The cell according to claim 3, wherein at least one pair of abutting rims of, respectively, a pair of the outer surfaces defining said space are formed with beveled edges so as to form at least one elongated pit;

the reservoir's housing is formed by at least a portion of the pit and a sealed cover glued to the pit margins along said portion.

5. The cell according to claim 4, wherein portions of the pit at opposite sides of said portion constituting the reservoir are filled with a gluing material, providing thereby safety sealing of the cell.

6. The cell according to claim 4, wherein said sealed cover of the reservoir is made of an insulating material which is inert to said first and second media.

7. The cell according to claim 3, wherein said housing is made of an insulating material which is inert to said first and second media.

8. The cell according to claim 1, and also comprising a certain amount of gas contained within the reservoir.

9. The cell according to claim 8, wherein said gas is inert to said first and second media.

10. The cell according to claim 9, wherein said gas is air.

11. The cell according to claim 1, wherein each of the first and second media is formed of elongated molecules having a homogeneous orientation of their long axes, defining thereby the orientation of the optical axis of the cell.

12. The cell according to claim 1, wherein the cell represents a birefringent medium effecting a double refraction of light impinging thereon.

13. The cell according to claim 12, wherein the cell is used in a polarizer beam splitter (PBS) device.

14. The cell according to claim 12, wherein said first and second media are either identical or not oriented organic materials.

15. The cell according to claim 1, wherein the cell represents a light valve.

16. The cell according to claim 1, and also comprising polarizing films provided on the said outer surfaces of the substrates.

17. The cell according to claim 1, wherein said first and second media are either identical or not liquid crystals.

18. The cell according to claim 17, and also comprising at least first and second orienting layers located around the first and second media, respectively.

19. The cell according to claim 1, wherein said first and second media are either identical or not emulsion solutions.

20. The cell according to claim 1, wherein said first and second media are either identical or not gels.

21. The cell according to claim 1, wherein at least one pair of abutting rims of, respectively, a pair of the outer surfaces defining said space are formed with beveled edges so as to form at least one elongated pit which is filled with gluing and sealing materials.

22. An optical device utilizing at least one light-modulating cell for providing a desired propagation of light impinging thereon, said at least one cell comprising:

a pair of spaced-apart substrates made of a substantially optically transparent material with respect to incident radiation of a desired wavelength range, the substrates defining, respectively, a pair of spaced-apart parallel outer surfaces and a sealed space therebetween, the space being filled with a first substantially liquid light modulating medium; and at least one reservoir attached to at least one of said substrates, the reservoir containing a predetermined amount of a second substantially liquid light modulating medium, the inside of the reservoir being connected to the inside of said space for providing a continuous flow of said media into and out of said space.

* * * * *

UNITED STATES PATENT AND TRADEMARK OFFICE
CERTIFICATE OF CORRECTION

PATENT NO. : 6,236,489 B1  
DATED : May 22, 2001  
INVENTOR(S) : Klara Vinokur et al.

Page 1 of 1

It is certified that error appears in the above-identified patent and that said Letters Patent is hereby corrected as shown below:

<u>Column 8,</u>  
Line 18, after "the" insert the word -- space --.

Signed and Sealed this

Twenty-eighth Day of May, 2002

Attest:

JAMES E. ROGAN  
*Attesting Officer*   *Director of the United States Patent and Trademark Office*